(12) United States Patent
Lee et al.

(10) Patent No.: US 9,880,687 B2
(45) Date of Patent: Jan. 30, 2018

(54) TOUCH SCREEN PANEL INTEGRATED DISPLAY DEVICE

(71) Applicant: SAMSUNG DISPLAY CO., LTD., Yongin, Gyeonggi-Do (KR)

(72) Inventors: Il Ho Lee, Yongin (KR); Jin Woo Park, Yongin (KR); Ki Seok Cha, Yongin (KR); Seong Mo Hwang, Yongin (KR)

(73) Assignee: Samsung Display Co., Ltd. (KR)

( * ) Notice: Subject to any disclaimer, the term of this patent is extended or adjusted under 35 U.S.C. 154(b) by 105 days.

(21) Appl. No.: 14/864,349

(22) Filed: Sep. 24, 2015

(65) Prior Publication Data

US 2016/0139706 A1    May 19, 2016

(30) Foreign Application Priority Data

Nov. 13, 2014    (KR) .................. 10-2014-0158260

(51) Int. Cl.
G06F 3/041    (2006.01)
G06F 3/044    (2006.01)

(52) U.S. Cl.
CPC .... *G06F 3/044* (2013.01); *G06F 2203/04103* (2013.01)

(58) Field of Classification Search
CPC ........ G06F 3/041; G06F 3/0412; G06F 3/044; G06F 2203/04103
See application file for complete search history.

(56) References Cited

U.S. PATENT DOCUMENTS

| | | | | |
|---|---|---|---|---|
| 7,903,096 | B2 * | 3/2011 | Jeon | G02F 1/13338 345/102 |
| 8,134,535 | B2 * | 3/2012 | Choi | G06F 3/0412 178/18.01 |
| 9,454,275 | B2 * | 9/2016 | Kim, Il | G06F 3/044 |
| 2007/0285365 | A1 * | 12/2007 | Lee | G06F 3/0412 345/87 |
| 2010/0258360 | A1 | 10/2010 | Yilmaz | |
| 2013/0081869 | A1 | 4/2013 | Kim et al. | |
| 2014/0014960 | A1 * | 1/2014 | Yamazaki | G06F 3/0412 257/59 |
| 2014/0160061 | A1 * | 6/2014 | Kim | G02F 1/13338 345/174 |
| 2014/0160376 | A1 * | 6/2014 | Wang | G06F 3/044 349/12 |
| 2014/0232691 | A1 | 8/2014 | Lee | |
| 2015/0084888 | A1 * | 3/2015 | Han | G06F 3/0412 345/173 |

(Continued)

FOREIGN PATENT DOCUMENTS

KR    10-2013-0035243 A    4/2013
KR    10-2013-0035833 A    4/2013

*Primary Examiner* — Ricardo L Osorio
(74) *Attorney, Agent, or Firm* — Innovation Counsel LLP

(57) ABSTRACT

A touch screen panel integrated display device includes a first substrate divided into a display area and a non-display area disposed outside the display area, a gate driving circuit positioned in the non-display area of the first substrate, a second substrate facing the first substrate, detection electrodes formed on the second substrate, and electrode wires formed on the second substrate and electrically connected with the detection electrodes. The detection electrodes and the electrode wires are formed without overlapping the gate driving circuit.

11 Claims, 4 Drawing Sheets

(56) References Cited

U.S. PATENT DOCUMENTS

| | | | |
|---|---|---|---|
| 2015/0103263 A1* | 4/2015 | Han | G06F 1/1643 349/12 |
| 2015/0205407 A1* | 7/2015 | Kim | G06F 3/044 345/174 |
| 2015/0243203 A1* | 8/2015 | Kim | G09G 3/2092 345/212 |
| 2015/0370388 A1* | 12/2015 | Choi | G06F 3/047 345/173 |
| 2016/0018931 A1* | 1/2016 | Kurasawa | G06F 3/044 345/174 |
| 2016/0103526 A1* | 4/2016 | Sohn | G06F 3/044 345/174 |
| 2016/0282981 A1* | 9/2016 | Ding | G06F 3/044 |

* cited by examiner

TOUCH SCREEN PANEL INTEGRATED DISPLAY DEVICE

CROSS-REFERENCE TO RELATED APPLICATION

This application claims priority to and the benefit of Korean Patent Application No. 10-2014-0158260 filed Nov. 13, 2014 in the Korean Intellectual Property Office, the entire contents of which are incorporated herein by reference in their entirety.

BACKGROUND

1. Technical Field

The present disclosure generally relates to a touch screen panel integrated display device.

2. Description of the Related Art

A touch screen panel is an input device for enabling a user to input a command. For example, a user can input a command by selecting icons displayed on a screen of an image display device in the touch screen panel, using a hand or an object. In some instances, the touch screen panel may replace a separate input device (such as a keyboard and a mouse) connected to an image display device. By integrating the image display device with the touch screen panel, the range of applications for the touch screen panel can be expanded.

The touch screen panel may be implemented using different sensing schemes, for example, a resistive scheme, a light detection scheme, or a capacitance scheme. A capacitive touch screen panel includes detection electrodes arranged in an active touch area, and is configured to detect a change in capacitance between the detection electrodes when a hand or an object contacts the touch screen panel. The change in capacitance is used to calculate a touch position of the hand or the object.

The touch screen panel may be separately manufactured and attached onto a surface of a display panel. The touch screen panel may also be formed by directly patterning the display panel. A touch screen panel integrated display device, in which the touch screen panel is combined with the display panel, is widely used.

However, in some instances, the detection electrodes in the touch screen panel integrated display device may extend into a non-display area so as to maintain the capacitance between the detection electrodes at an edge of the display area. However, when a gate driving circuit is positioned in the non-display area of the display panel and overlaps with the detection electrodes, a coupling effect between the detection electrodes and the gate driving circuit may result in noise and generate a ghost touch, thereby degrading touch performance.

SUMMARY

The present disclosure addresses at least the above issues in the prior art.

According to an exemplary embodiment of the inventive concept, a touch screen panel integrated display device is provided. The touch screen panel integrated display device includes: a first substrate divided into a display area and a non-display area disposed outside the display area; a gate driving circuit positioned in the non-display area of the first substrate; a second substrate facing the first substrate; detection electrodes formed on the second substrate; and electrode wires formed on the second substrate and electrically connected with the detection electrodes, wherein the detection electrodes and the electrode wires are formed without overlapping the gate driving circuit.

In some embodiments, a portion of the electrode wires and the detection electrodes may be positioned within the display area.

In some embodiments, the gate driving circuit may be positioned at one side of the first substrate, and the electrode wires may be positioned at one side of the second substrate opposite to the one side of the first substrate.

In some embodiments, the touch screen panel integrated display device may further include a pixel unit formed in the display area of the first substrate, wherein the gate driving circuit may be configured to output a scan signal to the pixel unit.

In some embodiments, the first substrate may include a Thin Film Transistor (TFT) array substrate, and one or more transistors of the gate driving circuit may be formed on the TFT array substrate using a Low Temperature Poly Silicon (LTPS) process.

In some embodiments, the second substrate may include a color filter substrate of a liquid crystal display device or an encapsulation substrate of an organic light emitting display device.

In some embodiments, the detection electrodes may be connected to the electrode wires in a one-to-one correspondence.

In some embodiments, the detection electrodes may include first detection electrodes arranged in a first direction, and second detection electrodes arranged in a second direction crossing the first direction.

In some embodiments, the first detection electrodes and the second detection electrodes may be positioned on a same layer.

In some embodiments, the touch screen panel integrated display device may further include a bridge pattern connecting adjacent first detection electrodes.

In some embodiments, a light blocking layer may be formed in an area of a window substrate overlapping the non-display area.

BRIEF DESCRIPTION OF THE DRAWINGS

Exemplary embodiments will be described more fully herein with reference to the accompanying drawings. However, the inventive concept may be embodied in different forms and should not be construed as being limited to the embodiments described herein. Rather, the embodiments are provided so that the disclosure is thorough and complete, and fully convey the scope of the inventive concept to one of ordinary skill in the art.

In the drawings, dimensions may be exaggerated for clarity. It will be understood that when an element is referred to as being "between" two elements, the element may be the only element between the two elements, or with one or more intervening elements being present. Like reference numerals refer to like elements throughout.

DETAILED DESCRIPTION

Exemplary embodiments will be herein described in detail with reference to the accompanying drawings.

Figure 1:
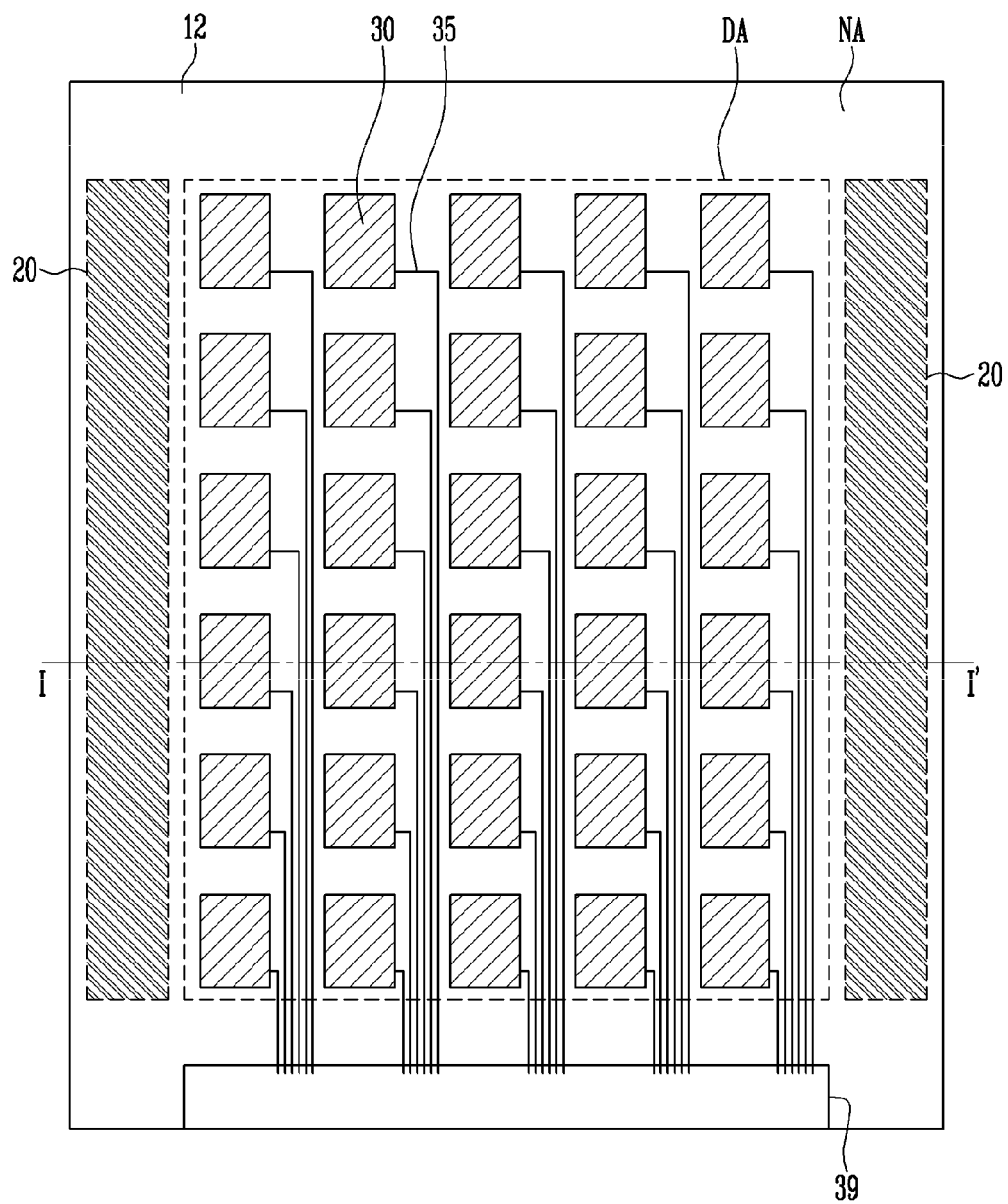
FIG. 1 is a plan view of a touch screen panel integrated display device according to an exemplary embodiment.
Figure 2:
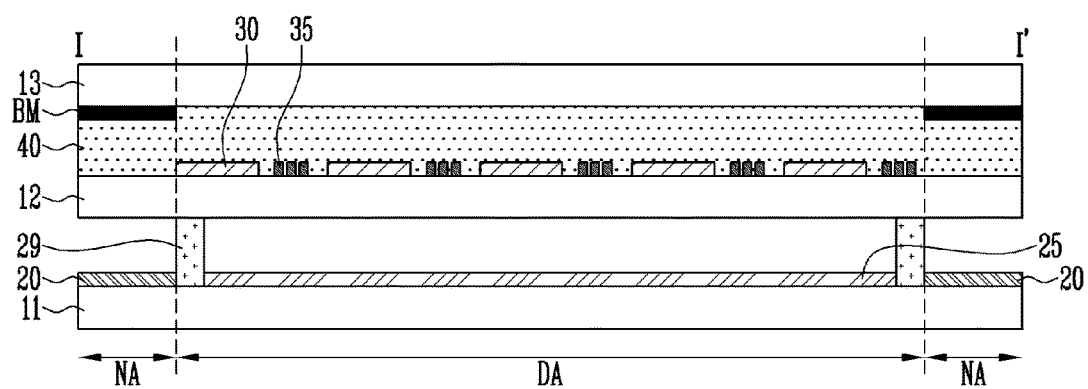
FIG. 2 is a cross-sectional view of the touch screen panel integrated display device of FIG. 1 taken along line I-I'.

FIG. 1 is a plan view of a touch screen panel integrated display device according to an exemplary embodiment, and FIG. 2 is a cross-sectional view of the touch screen panel integrated display device of FIG. 1 taken along line I-I'.

Referring to FIGS. 1 and 2, the touch screen panel integrated display device includes a first substrate 11, a gate driving circuit 20, a second substrate 12, detection electrodes 30, and electrode wires 35.

The first substrate 11 is divided into a display area DA in which an image is displayed, and a non-display area (NA) outside the display area DA. The first substrate 11 may be a Thin Film Transistor (TFT) array substrate and constitutes a lower substrate of the display device. The display device may be a liquid crystal display device or an organic light emitting display device. The first substrate 11 may be formed of a material having high thermal resistance and chemical resistance. In some embodiments, the first substrate 11 may be flexible. For example, the first substrate 11 may be a thin film substrate formed of one or more materials selected from a group comprising polyethylene terephthalate (PET), polycarbonate (PC), acryl, polymethyl methacrylate (PMMA), triacetyl cellulose (TAC), polyether sulfone (PES), and polyimide (PI). In some other embodiments, commonly used types of glass or tempered glass may be used as the substrate 11.

The gate driving circuit 20 is formed in the non-display area NA of the first substrate 11, and a pixel unit 25 is formed in the display area DA of the first substrate 11. A sealing member 29 may be positioned at a boundary of the display area DA and the non-display area NA to seal the pixel unit 25 within the display area DA. The pixel unit 25 may include pixels of a Liquid Crystal Display (LCD) device or an Organic Light Emitting Display (OLED) device. Since LCD and OLED devices are known to those skilled in the art, a detailed description of those devices and the pixel unit 25 shall be omitted.

The gate driving circuit 20 may be positioned at either one side, or left and right sides, of the non-display area NA of the first substrate 11. The gate driving circuit 20 may include a plurality of shift resisters (not illustrated) for outputting a scan signal to the pixel unit 25. The scan signal is synchronized to a clock signal provided from an external source. In some embodiments, one or more transistors in the gate driving circuit 20 may be formed on a TFT array substrate using a Low Temperature Poly Silicon (LTPS) process. Accordingly, in those embodiments, the gate driving circuit 20 may be directly patterned onto the first substrate 11.

The second substrate 12 constitutes an upper substrate of the display device and faces the first substrate 11. The second substrate 12 may be a color filter substrate of a liquid crystal display device, or an encapsulation substrate of an organic light emitting display device. In some embodiments, the second substrate 12 may be a separate base member of the touch screen panel, or an optical member (for example, a polarization film) of the display device. The second substrate 12 is divided into an active touch area for receiving a touch input and a non-active touch area outside the active touch area. The active touch area may overlap the display area DA, and the non-active touch area may overlap the non-display area NA. In some embodiments, the second substrate 12 may be formed of a same material as the first substrate 11.

The detection electrodes 30 include a plurality of conductive patterns for detecting a touch input, and may be evenly distributed and disposed in the display area DA of the second substrate 12. The touch screen panel may be based on a self-capacitance scheme, and may have a structure in which the detection electrodes 30 are electrically connected with the electrode wires 35 in a one-to-one correspondence. Furthermore, the electrode wires 35 may extend to a pad unit 39 of the non-display area NA through the display area DA.

The detection electrodes 30 and the electrode wires 35 are formed without overlapping the gate driving circuit 20. In other words, the detection electrodes 30 are positioned only within the display area DA without extending into the non-display area NA. The electrode wires 35 are substantially positioned within the display area DA, except for a lower portion of the electrode wires 35 that extends into the non-display area NA to connect with the pad unit 39. In particular, the detection electrodes 30 and the electrode wires 35 are formed such that they do not extend into the side portions of the non-display area NA, and do not overlap with the gate driving circuit 20.

In the embodiment of FIG. 1, each of the detection electrodes 30 is formed in the shape of a quadrangle pattern arranged in a lattice structure. However, the inventive concept is not limited thereto. In some embodiments, the detection electrodes 30 may have various shapes and patterns, such as a polygonal shape including a diamond, a triangle, a hexagon, a circle, or an ellipse. Furthermore, the detection electrodes 30 may be formed of a transparent conductive material (such as indium-tin-oxide (ITO), antimony tin oxide (ATO), indium-zinc-oxide (IZO), carbon nano-tube (CNT), or graphene), so as to allow light to pass through. In some embodiments, the detection electrodes 30 may be formed as a metal mesh pattern having a net structure.

The electrode wires 35 may be formed of a same material, and on a same layer, as the detection electrodes 30. In some other embodiments, the electrode wires 35 may be formed of a different material, and on a different layer, than the detection electrodes 30. In particular, the electrode wires 35 may be formed of a transparent conductive material such as ITO, or one or more materials selected from a group comprising low resistance metal materials such as molybdenum (Mo), silver (AgO), titanium (Ti), copper (Cu), and aluminum (Al). The electrode wires 35 may be formed having a line width ranging from, for example, several to tens of micro meters.

In some embodiments, the touch screen panel integrated display device may further include a window substrate 13 disposed on a front surface facing the first and second substrates 11 and 12, a light blocking layer BM formed on the window substrate 13 and overlapping the non-display area NA, and an adhesive layer 40 for bonding the second substrate 12 and the window substrate 13.

Figure 3:
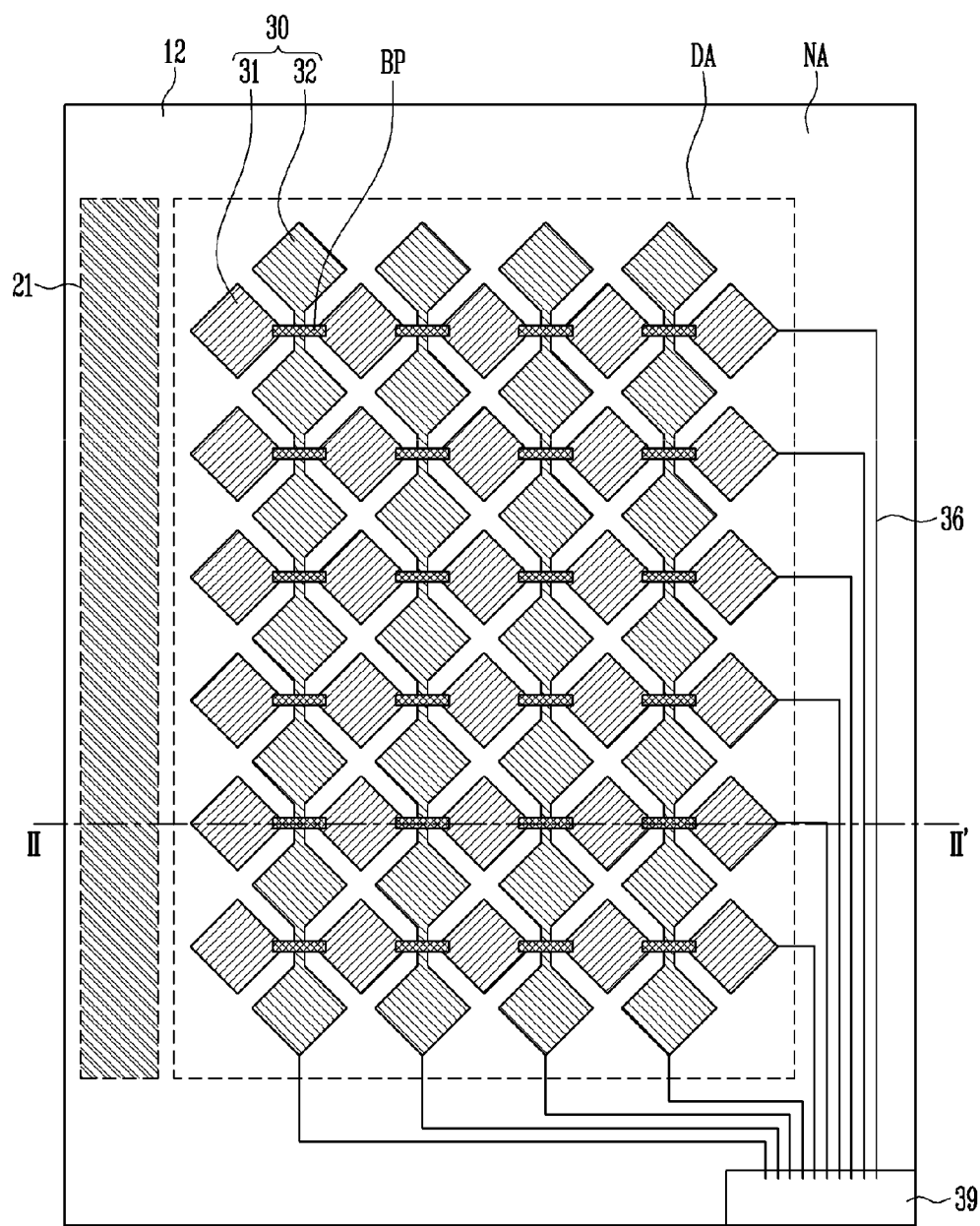
FIG. 3 is a plan view of a touch screen panel integrated display device according to another exemplary embodiment.
Figure 4:
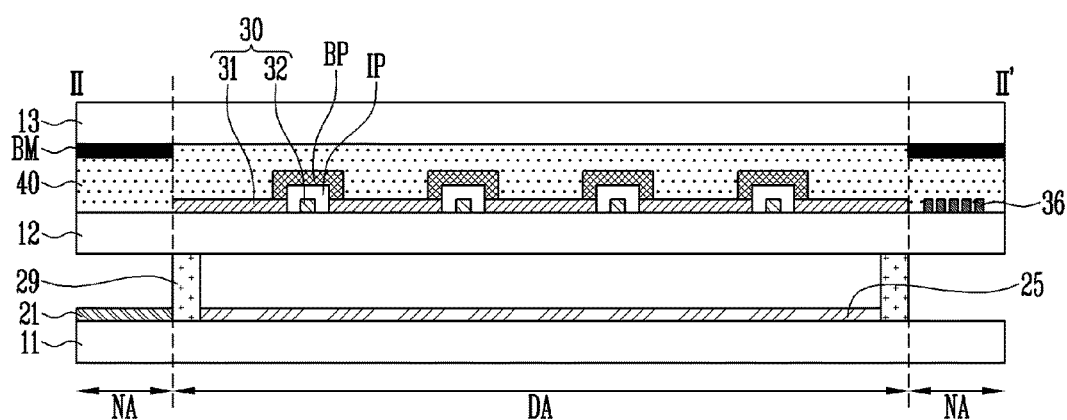
FIG. 4 is a cross-sectional view of the touch screen panel integrated display device of FIG. 3 taken along line II-II'.

FIG. 3 is a top plan view of a touch screen panel integrated display device according to an exemplary embodiment, and FIG. 4 is a cross-sectional view of the touch screen panel integrated display device of FIG. 3 taken along line II-II'.

The embodiment in FIGS. 3 and 4 includes elements similar to those in the embodiment of FIGS. 1 and 2, and therefore a detailed description of those similar elements shall be omitted.

Referring to FIGS. 3 and 4, the touch screen panel integrated display device includes detection electrodes 30 that are based on a mutual capacitance scheme. A gate driving circuit 21 is positioned at one side of a first substrate 11. Outer wires 36 are positioned at one side of a second substrate 12 opposite to the one side of the first substrate 11. Accordingly, the gate driving circuit 21 and the outer wires 36 do not overlap.

In particular, the detection electrodes 30 may include a plurality of first detection electrodes 31 and a plurality of second detection electrodes 32. The first detection electrodes 31 are distributed and disposed in a display area of a second substrate 12, and electrically connected in a first direction. The second detection electrodes 32 are distributed and disposed between the first detection electrodes 31 without overlapping the first detection electrodes 31, and electrically connected in a second direction crossing the first direction.

In the present embodiment, the first detection electrodes 31 and the second detection electrodes 32 are alternately disposed and connected in different directions. For example, the first detection electrodes 31 are formed in a row direction (horizontal direction) and connected with the electrode wires 36 in respective row lines. The second detection electrodes 32 are formed in a column direction (vertical direction) and connected with the electrode wires 36 in respective column lines.

The detection electrodes 30 may be formed of a transparent electrode material such as an ITO, so as to allow light of a display unit positioned at a lower side of the sensing electrode to pass through. In the embodiment of FIG. 3, the detection electrodes 30 are formed having a diamond shape. However, the inventive concept is not limited thereto. Any shape, material, and/or structure of the detection electrodes 30 may be contemplated. For example, in some embodiments, the detection electrodes 30 may have a metal mesh pattern formed of a low resistance metal material instead of a transparent electrode material. In some embodiments, the first and second detection electrodes 31 and 32 may be formed on different surfaces with the second substrate 12 interposed therebetween.

The electrode wires 36 connect the first detection electrodes 31 and the second detection electrodes 32 with an external driving circuit in each line. For example, the electrode wires 36 are electrically connected with the first and second detection electrodes 31 and 32 respectively in each row line and each column line, and connect the first and second detection electrodes 31 and 32 with an external driving circuit (such as a position detection circuit) through a pad unit 39. The electrode wires 36 are disposed in an outer non-display area NA without overlapping a display area DA. The electrode wires 36 may be formed of a low resistance metal material such as molybdenum (Mo), silver (Ag), titanium (Ti), copper (Cu), aluminum (Al), or molybdenum/aluminum/molybdenum (Mo/Al/Mo), or a transparent electrode material.

In the present embodiment, all the wire patterns of the electrode wires 36 connected with the first detection electrodes 31 are formed at a right side of the display panel. The gate driving circuit 21 is positioned at a left side of the display panel. Accordingly, the gate driving circuit 21 and the outer wires 36 do not overlap. The first and second detection electrodes 31 and 32 are also positioned within the display area DA without extending into the non-display area NA, so as to avoid overlapping the gate driving circuit 21.

In some embodiments, the touch screen panel may include a bridge pattern BP formed on the same layer as the first detection electrode 31 and the second detection electrode 32, and electrically connecting adjacent first detection electrodes 31. The touch screen panel may further include an insulation pattern IP interposed between the detection electrode 32 and the bridge pattern BP.

The bridge pattern BP may be formed of a transparent electrode material, or an opaque low resistance metal material, similar to that of the detection electrodes 30. A width, thickness, and length of the bridge pattern BP may be adjusted to hide the bridge pattern BP from a user's view. In some embodiments, the bridge pattern BP may be inclined in a diagonal direction to more effectively hide it from view. The insulation pattern IP may be partially disposed between the second detection electrode 32 and the bridge pattern BP. In some embodiments, the insulation pattern IP may be formed on the display area DA in which the detection electrodes 30 are formed.

In the embodiments described in FIGS. 1 through 4, the detection electrodes and the electrodes lines are formed without overlapping the gate driving circuit. Accordingly, coupling noise between the detection electrodes/electrodes lines and the gate driving circuit may be prevented or reduced.

Exemplary embodiments have been disclosed herein. Although specific terms may have been used, they are to be interpreted in a generic and descriptive sense and should not be construed in a limiting manner. In some instances, features, characteristics, and/or elements described in connection with a particular embodiment may be used alone or in combination with features, characteristics, and/or elements described in connection with other embodiments, unless specified otherwise. Accordingly, it will be understood by those of ordinary skill in the art that various changes may be made to the embodiments without departing from the spirit and scope of the present disclosure.

What is claimed is:

1. A touch screen panel integrated display device, comprising:
   a first substrate divided into a display area and a non-display area disposed outside the display area;
   a gate driving circuit positioned in the non-display area of the first substrate;
   a second substrate facing the first substrate;
   detection electrodes formed on the second substrate; and
   electrode wires formed on the second substrate and electrically connected with the detection electrodes,
   wherein the electrode wires are positioned without overlapping the detection electrodes,
   wherein a portion of the electrode wires is positioned in the display area between adjacent detection electrodes, and
   wherein the detection electrodes and the electrode wires are formed without overlapping the gate driving circuit.

2. The touch screen panel integrated display device of claim 1, wherein the detection electrodes and the electrode wires are positioned on a same layer.

3. The touch screen panel integrated display device of claim 1, wherein the gate driving circuit is positioned at one side of the first substrate, and the electrode wires are positioned at one side of the second substrate opposite to the one side of the first substrate.

4. The touch screen panel integrated display device of claim 1, further comprising:
   a pixel unit formed in the display area of the first substrate,
   wherein the gate driving circuit is configured to output a scan signal to the pixel unit.

5. The touch screen panel integrated display device of claim 1, wherein the first substrate includes a Thin Film Transistor (TFT) array substrate, and
   one or more transistors of the gate driving circuit are formed on the TFT array substrate using a Low Temperature Poly Silicon (LTPS) process.

6. The touch screen panel integrated display device of claim 1, wherein the second substrate includes a color filter substrate of a liquid crystal display device or an encapsulation substrate of an organic light emitting display device.

7. The touch screen panel integrated display device of claim 1, wherein the detection electrodes are connected to the electrode wires in a one-to-one correspondence.

8. The touch screen panel integrated display device of claim 1, wherein the detection electrodes include first detection electrodes arranged in a first direction, and second detection electrodes arranged in a second direction crossing the first direction.

9. The touch screen panel integrated display device of claim 8, wherein the first detection electrodes and the second detection electrodes are positioned on a same layer.

10. The touch screen panel integrated display device of claim 9, further comprising:
   a bridge pattern connecting adjacent first detection electrodes.

11. The touch screen panel integrated display device of claim 1, wherein a light blocking layer is formed in an area of a window substrate overlapping the non-display area.

\* \* \* \* \*